(12) United States Patent
Malpani et al.

(10) Patent No.: US 7,760,626 B2
(45) Date of Patent: Jul. 20, 2010

(54) LOAD BALANCING AND FAILOVER

(75) Inventors: Navneet Malpani, Austin, TX (US);
Xuebin Yao, Austin, TX (US); Charles A. Musta, Austin, TX (US)

(73) Assignee: INTEL Corporation, Santa Clara, CA (US)

( * ) Notice: Subject to any disclaimer, the term of this patent is extended or adjusted under 35 U.S.C. 154(b) by 1637 days.

(21) Appl. No.: 10/815,349

(22) Filed: Mar. 31, 2004

(65) Prior Publication Data

US 2005/0259632 A1 Nov. 24, 2005

(51) Int. Cl.
*H04L 12/28* (2006.01)
(52) U.S. Cl. ............... 370/230; 370/395.4; 370/428
(58) Field of Classification Search ......... 370/235, 370/231, 230.1, 395.41, 328, 395.4, 428
See application file for complete search history.

(56) References Cited

U.S. PATENT DOCUMENTS 4,403,286 A * 9/1983 Fry et al. ............... 718/105

(Continued)

FOREIGN PATENT DOCUMENTS

JP 2002-304331 10/2002

(Continued)

OTHER PUBLICATIONS

Adaptive routing and load balancing of ephemeral connections; Heusse, M.; Kermarrec, Y.; Universal Multiservice Networks, 2000. ECUMN 2000. 1st European Conference on Oct. 2-4, 2000 pp. 100-108.*

(Continued)

*Primary Examiner*—Salman Ahmed
(74) *Attorney, Agent, or Firm*—Konrad Raynes & Victor LLP; Janaki K. Davda

(57) ABSTRACT

Provided are techniques for static load balancing. For each data path in a network adapter team, a load balancing value is computed. A maximum value of the computed load balancing values is determined. A data path with the maximum value is selected for use in routing data. Also provided are techniques for dynamic load balancing in which, when a load balancing share of a data path is less than an actual load balancing share, the load balancing share of the data path is adjusted. Furthermore, provided are techniques for failover processing in which a command is routed through a second network adapter in response to determining that the command may not be routed through a first network adaptor.

27 Claims, 10 Drawing Sheets

U.S. PATENT DOCUMENTS

| | | | |
|---|---|---|---|
| 5,006,781 A * | 4/1991 | Schultz et al. | 322/25 |
| 5,086,499 A | 2/1992 | Mutone | |
| 5,168,208 A * | 12/1992 | Schultz et al. | 322/25 |
| 5,390,068 A * | 2/1995 | Schultz et al. | 361/95 |
| 5,493,689 A * | 2/1996 | Waclawsky et al. | 710/1 |
| 5,495,426 A * | 2/1996 | Waclawsky et al. | 709/226 |
| 5,724,569 A * | 3/1998 | Andres | 707/2 |
| 5,790,775 A | 8/1998 | Marks et al. | |
| 6,052,795 A | 4/2000 | Murotani et al. | |
| 6,081,511 A * | 6/2000 | Carr et al. | 370/256 |
| 6,185,601 B1 * | 2/2001 | Wolff | 709/203 |
| 6,381,218 B1 | 4/2002 | McIntyre et al. | |
| 6,430,610 B1 | 8/2002 | Carter | |
| 6,438,133 B1 * | 8/2002 | Ervin et al. | 370/403 |
| 6,453,360 B1 * | 9/2002 | Muller et al. | 709/250 |
| 6,470,397 B1 | 10/2002 | Shah et al. | |
| 6,526,521 B1 | 2/2003 | Lim | |
| 6,618,798 B1 | 9/2003 | Burton et al. | |
| 6,654,801 B2 | 11/2003 | Mann et al. | |
| 6,658,018 B1 | 12/2003 | Tran et al. | |
| 6,687,735 B1 * | 2/2004 | Logston et al. | 709/203 |
| 6,711,137 B1 * | 3/2004 | Klassen et al. | 370/252 |
| 6,769,071 B1 | 7/2004 | Cheng et al. | |
| 6,802,021 B1 | 10/2004 | Cheng et al. | |
| 6,823,477 B1 | 11/2004 | Cheng et al. | |
| 6,940,853 B2 * | 9/2005 | Yamada et al. | 370/389 |
| 6,941,341 B2 * | 9/2005 | Logston et al. | 709/203 |
| 6,990,553 B2 | 1/2006 | Nakayama et al. | |
| 7,003,687 B2 | 2/2006 | Matsunami et al. | |
| 7,016,367 B1 * | 3/2006 | Dyckerhoff et al. | 370/429 |
| 7,111,084 B2 | 9/2006 | Tan et al. | |
| 7,126,910 B1 * | 10/2006 | Sridhar | 370/229 |
| 7,134,040 B2 | 11/2006 | Ayres | |
| 7,139,242 B2 * | 11/2006 | Bays | 370/238 |
| 7,281,169 B2 | 10/2007 | Golasky et al. | |
| 7,307,948 B2 | 12/2007 | Infante et al. | |
| 7,308,604 B2 | 12/2007 | McDonnell et al. | |
| 7,310,341 B2 * | 12/2007 | Prager et al. | 370/395.5 |
| 7,313,681 B2 | 12/2007 | Chen et al. | |
| 7,330,972 B2 | 2/2008 | Vlodavsky et al. | |
| 7,496,104 B2 * | 2/2009 | Moussa et al. | 370/401 |
| 7,603,463 B2 * | 10/2009 | Argo | 709/225 |
| 2002/0141343 A1 * | 10/2002 | Bays | 370/235 |
| 2003/0074473 A1 * | 4/2003 | Pham et al. | 709/246 |
| 2003/0126315 A1 | 7/2003 | Tan et al. | |
| 2003/0140191 A1 | 7/2003 | McGowen et al. | |
| 2004/0107304 A1 | 6/2004 | Grun | |
| 2004/0153710 A1 | 8/2004 | Fair | |
| 2004/0162901 A1 * | 8/2004 | Mangipudi et al. | 709/225 |
| 2004/0184483 A1 * | 9/2004 | Okamura et al. | 370/477 |
| 2004/0203827 A1 * | 10/2004 | Heiner et al. | 455/452.1 |
| 2004/0236860 A1 * | 11/2004 | Logston et al. | 709/230 |
| 2005/0185789 A1 | 8/2005 | Goodwin | |
| 2006/0173331 A1 * | 8/2006 | Booton et al. | 600/445 |
| 2006/0193331 A1 * | 8/2006 | Areddu et al. | 370/396 |
| 2006/0242313 A1 * | 10/2006 | Le et al. | 709/230 |
| 2006/0291392 A1 * | 12/2006 | Alicherry et al. | 370/235 |
| 2007/0030804 A1 * | 2/2007 | Kimball et al. | 370/235 |
| 2007/0070893 A1 * | 3/2007 | Butenweg et al. | 370/230 |
| 2007/0133406 A1 * | 6/2007 | Vasseur | 370/230 |
| 2007/0153763 A1 * | 7/2007 | Rampolla et al. | 370/351 |
| 2007/0271570 A1 * | 11/2007 | Brown et al. | 718/105 |
| 2008/0034249 A1 | 2/2008 | Husain et al. | |
| 2008/0291826 A1 * | 11/2008 | Licardie et al. | 370/230 |
| 2009/0193105 A1 * | 7/2009 | Charny et al. | 709/223 |

FOREIGN PATENT DOCUMENTS

| | | |
|---|---|---|
| RU | 2202123 | 4/2003 |

OTHER PUBLICATIONS

Distributed routing for load balancing; Boel, R.K.; van Schuppen, J.H.; Proceedings of the IEEE vol. 77, Issue 1, Jan. 1989 pp. 210-221.*

A dynamic routing algorithm with load balancing heuristics for restorable connections in WDM networks; Lu Ruan; Luo, H.; Chang Liu; Selected Areas in Communications, IEEE Journal on vol. 22, Issue 9, Nov. 2004 pp. 1823-1829.*

Load balancing routing with bandwidth-delay guarantees; Gopalan, K.; Tzi-cker Chiueh; Yow-Jian Lin; Communications Magazine, IEEE; vol. 42, Issue 6, Jun. 2004 pp. 108-113.*

Simple mathematical modeling of efficient path selection for QoS routing in load balancing; Man-Ching Yuen; Weijia Jia; Chi-Chung Cheung; Multimedia and Expo, 2004. ICME '04. 2004 IEEE International Conference on.*

An efficient QoS routing algorithm based on nonlinear path distance for min-sharing interference and load balancing Xiaolong Yang; Shuheng Zhou; Min Zhang; Xuefei Tang; Jinde Liu; Computer and Information Technology, 2004. CIT '04. The Fourth International Conference on Sep. 14-16, 2004 pp. 380-385.*

Dynamic congestion-based load balanced routing in optical burst-switched networks; Thodime, G.R.V.; Vokkarane, V.M.; Jue, J.P.; Global Telecommunications Conference, 2003. GLOBECOM '03. IEEE vol. 5, 2003 pp. 2628-2632 vol. 5.*

Modeling and performance analysis of QoS-aware load balancing of Web-server clusters; Computer Networks; vol. 40, Issue 2, Oct. 7, 2002, pp. 235-256.*

Supporting QoS routing in mobile ad hoc networks using probabilistic locality and load balancing queensu.ca [PDF]ES Elmallah, HS Hassanein, HM - GLOBECOM-NEW 2001.*

QoS-Aware Routing Schemes Based on Hierarchical Load-Balancing for Integrated Services Packet Networks (1999).*

PCI-SIG "PCI Specifications," www.pcisig.com, copyright 2004; 18 pp.

Shanley, T. and D. Anderson, "PCI System Architecture, 4th edition," Mindshare, Inc., 1999; Chapters 1 & 2, 61 pp.

"Serial ATA 1.0a Specification," Serial ATA Specs and Design Guides, www.serialata.com Feb. 4, 2003; 2 pp.

"Serial ATA: High Speed Serialized AT Attachment," Serial ATA Workgroup rev. 1.0, Aug. 29, 2001; 36 pp.

"How to Get T10 Draft Standards (and other Publications)," www.t10.org, 3 pp.

"Information Technology—SCSI Architecture Model—2 (SAM-2)," T10 Project 1157-D, www.t10.org, 91 pp.

Krueger, et al. "Small Computer Systems Interface protocol over the Internet (iSCSI) Requirements and Design Considerations," Network Working Group of The Internet Society, RFC 3347, (2002), 23 pp.

Weber, et al. "Fiber Channel (FC) Frame Encapsulation," Network Working Group of The Internet Society, RFC 3643, (2003), 17 pp.

"Transmission Control Protocol: DARPA Internet Program Protocol Specification," Information Sciences Institute for Defense Advanced Research Projects Agency, RFC 793, (Sep. 1981), 80 pp.

"Internet Protocol: DARPA Internet Program Protocol Specification," Information Sciences Institute for Defense Advanced Research Projects Agency, RFC 791, (Sep. 1981), 44 pp.

IEEE Std 802.11b-1999, Part 11: Wireless LAN Medium Access Control (MAC) and Physical Layer (PHY) Specifications, Sep. 16, 1999; 17 pp.

IEEE Std 802.3—2002, Part 3: Carrier sense multiple access with collision detection (CSMA/CD) access method and physical layer specifications, Mar. 8, 2002; 33 pp.

IEEE Std 802.11a—1999, Part 11: Wireless LAN Medium Access Control (MAC) and Physical Layer (PHY) Specifications, 12 pp.

IEEE Std 802.11g—2003, Part 11: Wireless LAN Medium Access Control (MAC) and Physical Layer (PHY) Specifications, Jun. 27, 2003; 22 pp.

Satran, et al., "iSCSI," IP Storage Working Group for Internet Engineering Task Force, www.ietf.org; Jan. 19, 2003; 51 pp.
"dpANS Fibre Channel Protocol for SCSI," X3.269-199X, Revision 12, Dec. 4, 1995; 75 pp.
"dpANSI Fibre Channel Fabric Generic Requirements," X3.289-199x, Rev. 3.5, Aug. 7, 1996; 35 pp.
"dpANSI Fibre Channel Arbitrated Loop," www.t11.org; X3.272-199x, Rev. 4.5, Jun. 1, 1995; 102 pp.
"dpANS Fibre Channel Generic Services," www.t11.org; X3.288-199x, Rev. 3.1, Aug. 7, 1996; 100 pp.
"dpANSI Fibre Channel Framing and Signaling," www.t11.org; INCITS working draft, Apr. 9, 2003; 106 pp.
Alacritech Inc., "Delivering High-Performance Storage Networking", 2001, 8 pp.
Aspen Systems, "Load Balancing Clustering", [online], [Retrieved 2003], retrieved from the Internet at <URL: http://www.aspsys.com/clusters/load_balancing/>.
Brocade Communication Systems Inc, "Improving System Availability With Storage Area Networks", 2001, 22 pp.
Cisco Systems, Inc., "Cisco Load Balancing Solutions", FO_4553_c1, 1999, 50 pp.
Cisco Systems, Inc., "High Availability for Cisco SN 5420: Storage Router-Based iSCSI Solutions", White Paper, 2002, pp. 1-32.
Cisco Systems, Inc., "High Availability Quick Look", White Paper, [Retrieved on Sep. 18, 2006], retrieved from the Internet at <URL: http://whitepapers.zdnet.co.uk>.
Cisco Systems, Inc., "Load Balancing: A Multifaceted Solution for Improving Server Availability", White Paper, 1998, pp. 1-4.
Cisco Systems, Inc., "MultiNode Load Balancing: Technical Documents", [online], 2002, [Retrieved 2003], retrieved from the Internet at <URL: http://www.cisco.com/warp/public/cc/pd/ibsw/mulb/tech/>.
Compaque Corp, "Intelligent Traffic Management—Global Load Balancing in a DISA Environment", Technical Guide, Feb. 2002, pp. 1-23.
Dot Hill Systems Corp., "SANpath v3.1 Software Product Description", Jul. 2000, Revision A, pp. 1-11.
Falconstor, "Superior Resiliency, Availability, and Performance with IPStor DynaPath", White Paper, 2001, pp. 1-9.
Robertson, A., "High-Availability Linux Project", [online], Sep. 24, 2003, [Retrieved 2003], retrieved from the Internet at <URL: http://www.linux-ha.org/>, 7pp.
IEEE, "High Availability", [online], [Retrieved 2003], retrieved from the Internet at <URL: http://www.geocities.com/Paris/Musee/2712/tfcc.html>, 3 pp.
Intel Corp., "Advanced Networking Services: Teaming", [online], 2003, [Retrieved 2003], retrieved from the Internet at <URL: http://support.intel.com/support/network/adapter/ans/teaming.htm>, 4 pp.
Linuxcare, "T3 Multipath Failover System FAQ", [online], 2000, [Retrieved 2003], retrieved from the Internet at <URL: http://open-projects.linuxcare.com/t3/faq.html>, 3 pp.
Meinen, D., "High Availability Secure Path for Windows NT", Nov. 1999, 37 pp.
Mylex, "Clustering & Fibre Channel: Next Wave in PC Computing", printed on Oct. 22, 2003, pp. 1-32.
Neomar, "Neomar LBFO Module: When Wireless Means Business", printed on Oct. 22, 2003, 2 pp.
Ottem, E., "SANs for High Availability Systems", WP-HA0201, 2001, pp. 1-6.
PCT IPRP, Sep. 28, 2006, for International Application No. PCT/RU2004/000105.
PCT International Search Report and Written Opinion, Dec. 16, 2004, for International Application No. PCT/RU2004/000105.
Qlogic Corp., "Qlogic Fibre Channel Software: Enhancing Disk Adapter Performance, Function, and Control", White Paper, FC0132001-01 Rev B, May 2, 2000, pp. 1-21.
Sun Microsystems, Inc., "Sun Clusters", White Paper, Oct. 1997, pp. 1-33.
Sun Microsystems, Inc., "Sun Multipath Failover Driver 1.0 for Windows NT User's Guide", White Paper, Revision 01, Feb. 2001, pp. 1-26.
Weber, R., "It's the I_T Nexus, Stupid", 01-093r0, [Retrieved 2003], 2005, pp. 1-11.
Zeus Technology, "Building High Performance, High-Availability Clusters", Jun. 16, 2000, Version 1.0, pp. 1-12.
Chinese First Office Action, Feb. 15, 2008, for CN Application No. 200480041815.9, 29 pp.
Great Britain Second Office Action, Jul. 27, 2007, for Application No. GB0616648.2, 4 pp.
Response to Office Action 1, Jul. 3, 2008, for Chines Application No. CN200480041815.9, 13 pp.
Response to Office Action 2, Oct. 20, 2008, for Chinese Application No. CN200480041815.9, 21 pp.
Office Action 1, Dec. 18, 2006, for Application No. GB0616648.2, 5 pp.
Office Action 2, Aug. 1, 2008, for Application No. CN200480041815.9, 11 pp.
Office Action 3, Jan. 24, 2008, for Application No. GB0616648.2, 5 pp.
Response to Office Action 1, Jun. 18, 2007, for Application No. GB0616648.2, 10 pp.
Response to Office Action 2, Nov. 12, 2007, for Application No. GB0616648.2, 6 pp.
Response to Office Action 3, Feb. 18, 2008, for Application No. GB0616648.2, 6 pp.
Office Action 1, Apr. 7, 2009, for Application No. JP2007-500707, 3 pp.
Abstract and Translation for Japanese Publication No. JP2002-304331, Oct. 18, 2002, 12 pp.
U.S. Appl. No. 10/599,055, filed Sep. 18, 2006, entitled "Failover and Load Balancing", invented by A. Belyakov, M. Sennikovsky, and A. Drozdov, 35 pages.
U.S. Appl. No. 12/749,407, filed Mach 29, 2010, entitled "Failover and Load Balancing", invented by A. Belyakov, M. Sennikovsky, and A. Drozdov, 33 pages.
Notice of Allowance, Dec. 1, 2009, for Application No. JP2007500707, 4 pages.
Response to Office Action, Aug. 6, 2009, for Application No. JP2007500707, 17 pages.

* cited by examiner

LOAD BALANCING AND FAILOVER

BACKGROUND

An I_T nexus is a pairing of an initiator device and a target device. The devices that request input/output (I/O) operations are referred to as initiators and the devices that perform these operations are referred to as targets. For example, a host computer may be an initiator, and a storage array may be a target. The target may include one or more separate storage devices.

A Host Bus Adapter (HBA) is a hardware device that "connects" the operating system of a host computer and a communication path (e.g., a Small Computer System Interface (SCSI) (American National Standards Institute (ANSI) SCSI Controller Commands-2 (SCC-2) NCITS.318:1998) bus). The HBA manages the transfer of data between the host computer and the communication path.

Internet Small Computer Systems Interface (iSCSI) is a protocol (IETF RFC 3347, published February 2003; IETF Draft, published Jan. 19, 2003) that defines a technique for transporting SCSI commands/data to and from I/O devices across TCP ("Transmission Control Protocol")-enabled networks (Internet Engineering Task Force (IETF) Request for Comments (RFC) 793, published September 1981). As such, iSCSI acts as a bridge between two independently designed protocols that have significantly different tolerances for, and facilities for, detecting and recovering from network congestion and from errors. iSCSI permits the existence of multiple parallel data paths to the same storage target.

HBA teaming refers to grouping together several HBAs to form a "team," where each HBA in a team is connected to a particular target and may route data to that target. HBA teams may be built on an Internet Small Computer System Interface (iSCSI) portal group concept. A portal group concept may be described as a collection of network portals within an iSCSI Network Entity that collectively support the capability of coordinating a session with connections spanning these portals. HBA teaming may be used with Small Computer System Interface (SCSI) initiators running a Linux® operating system.

Notwithstanding conventional techniques for load balancing and failover, there is a need in the art for improved failover and load balancing across several HBAs, each of which may have one or more connections to the same target.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
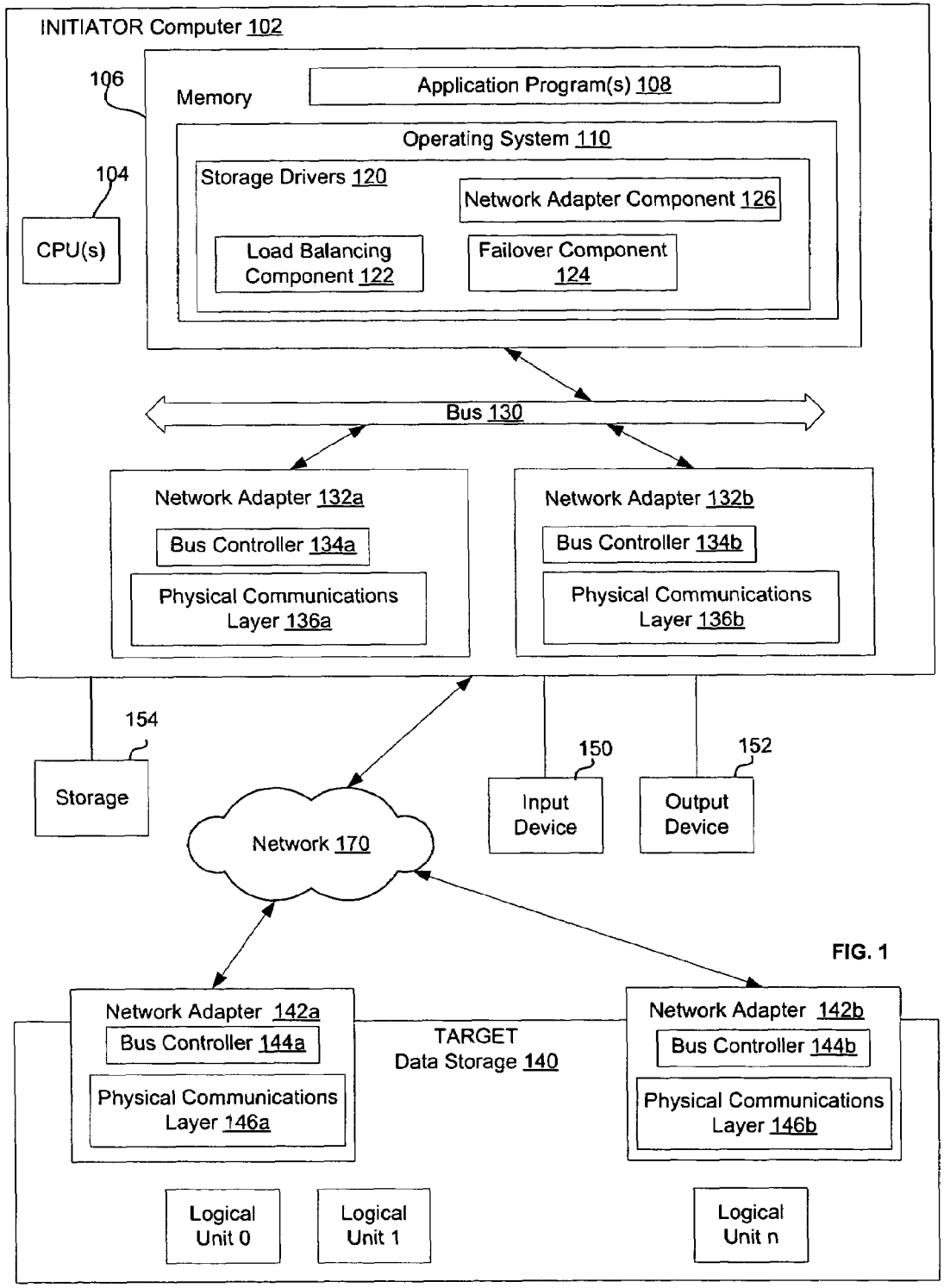
FIG. 1 illustrates computer system in accordance with certain embodiments.

FIG. 1 illustrates a computing environment in which embodiments may be implemented. A computer 102 acts as an initiator, while data storage 140 acts as a target to form an I_T nexus. Computer 102 includes one or more central processing units (CPUs) 104, a volatile memory 106, non-volatile storage 154 (e.g., magnetic disk drives, optical disk drives, a tape drive, etc.), and network adapters 132a, 132b. Although two network adapters 132a, 132b are shown, any number of network adapters may be included at computer 102. In certain embodiments, each network adapter 132a, 132b is a Host Bus Adapter (HBA). One or more application programs and an operating system 110 (e.g., a Linux® operating system) execute in memory 106. Operating system 110 includes storage drivers 120. The storage drivers 120 include a load balancing component 122, a failover component 124, and a network adapter component 126 that execute in memory 106.

The network adapter component 126 includes network adapter specific commands to communicate with each network adapter 132a, 132b and interfaces between the operating system 110 and each network adapter 132a, 132b. The network adapters 132a, 132b and network adapter component 126 implement logic to process iSCSI packets, where a SCSI command is wrapped in the iSCSI packet, and the iSCSI packet is wrapped in a TCP packet. The transport protocol layer unpacks the payload from the received Transmission Control Protocol (TCP) (Internet Engineering Task Force (IETF) Request for Comments (RFC) 793, published September 1981) packet and transfers the data to the network adapter component 126 to return to, for example an application program 108. Further, an application program 108 transmitting data transmits the data to the network adapter component 126, which then sends the data to the transport protocol layer to package in a TCP/IP (Internet Protocol (IP) is described in, Internet Engineering Task Force (IETF) Request for Comments (RFC) 791, published September 1981) packet before transmitting over the network 170.

Each network adapter 132a, 132b includes various components implemented in the hardware of the network adapter 132a, 132b. Each network adapter 132a, 132b is capable of transmitting and receiving packets of data over network 170, which may comprise a Local Area Network (LAN), the Internet, a Wide Area Network (WAN), Storage Area Network (SAN), WiFi (Institute of Electrical and Electronics Engineers (IEEE) 802.11a, published 1999: IEEE 802.11b, published Sep. 16, 1999; IEEE 802.11g, published Jun. 27, 2003), Wireless LAN (IEEE 802.11a, published 1999; IEEE 802.11b, published Sep. 16, 1999; 802.11g, published Jun. 27, 2003), etc.

In particular, network adapter 132a includes bus controller 134a and physical communications layer 136a. Network adapter 132b includes bus controller 134b and physical communications layer 136b. A bus controller 134a, 134b enables each network adapter 132a, 132b to communicate on a computer bus 130, which may comprise any bus interface known in the art, such as a Peripheral Component Interconnect (PCI) bus or PCI express bus (PCI Special Interest Group, PCI Local Bus Specification, Rev 2.3, published March 2002), etc. The physical communication layer 136a, 136b implements Media Access Control (MAC) functionality to send and receive network packets to and from remote data storages over a network 170. In certain embodiments, the network adapters 132a, 132b may implement the Ethernet protocol (IEEE std. 802.3, published Mar. 8, 2002), Fibre Channel ANSI X3.269-199X, Revision 012, published Dec. 4, 1995; FC Arbitrated Loop, ANSI X3.272-199X, Draft, published Jun. 1, 1995; FC Fabric Generic Requirements, ANSI X3.289-199X, Draft, published Aug. 7, 1996; Fibre Channel Framing and Signaling Interface ANSI/INCITS 373, Draft, published Apr. 9, 2003; FC Generic Services ANSI X3.288-199X, Draft, published Aug. 7, 1996), or any other network communication protocol known in the art.

The computer 102 may comprise a computing device known in the art, such as a mainframe, server, personal computer, workstation, laptop, handheld computer, etc. Any CPU 104 and operating system 110 may be used. Programs and data in memory 106 may be swapped into and out of storage 154 as part of memory management operations. The storage 154 may comprise an internal storage device or an attached or network accessible storage. Programs in the storage 154 are loaded into the memory 106 and executed by the CPU 104. An input device 150 and an output device 152 are connected to the computer 102. The input device 150 is used to provide user input to the CPU 104 and may be a keyboard, mouse, pen-stylus, microphone, touch sensitive display screen, or any other activation or input mechanism known in the art. The output device 152 is capable of rendering information transferred from the CPU 104, or other component, at a display monitor, printer, storage or any other output mechanism known in the art.

In certain embodiments, in addition to the storage drivers 120, the computer 102 may include other drivers. The network adapters 132a, 132b may include additional hardware logic to perform additional operations to process received packets from the computer 102 or the network 170. Further, the network adapters 132a, 132b may implement a transport layer offload engine (TOE) to implement the transport protocol layer in the network adapter as opposed to the computer storage drivers 120 to further reduce computer 102 processing burdens. Alternatively, the transport layer may be implemented in the storage drivers 120 or other drivers (for example, provided by an operating system).

The data storage 140 is connected to network 170 and includes network adapters 142a, 142b. Network adapter 142a includes a bus controller 144a and a physical communications layer 146a. Network adapter 142b includes a bus controller 144b and a physical communications layer 146b. The data storage 140 includes one or more logical units (i.e., "n" logical units, where "n" may be any positive integer value, which in certain embodiments, is less than 128). Merely for ease of understanding, logical unit 0, logical unit 1, and logical unit "n" are illustrated. Each logical unit may be described as a separate storage device. Additionally, a logical unit number (LUN) is associated with each logical device. In certain embodiments, a network adapter team is organized based on the target and LUN (i.e., each network adapter that can route data to a particular LUN of a target is grouped into one network adapter team), and one network adapter may belong to different network adapter teams.

Various structures and/or buffers (not shown) may reside in memory 106 or may be located in a storage unit separate from the memory 106 in certain embodiments.

Figure 2:
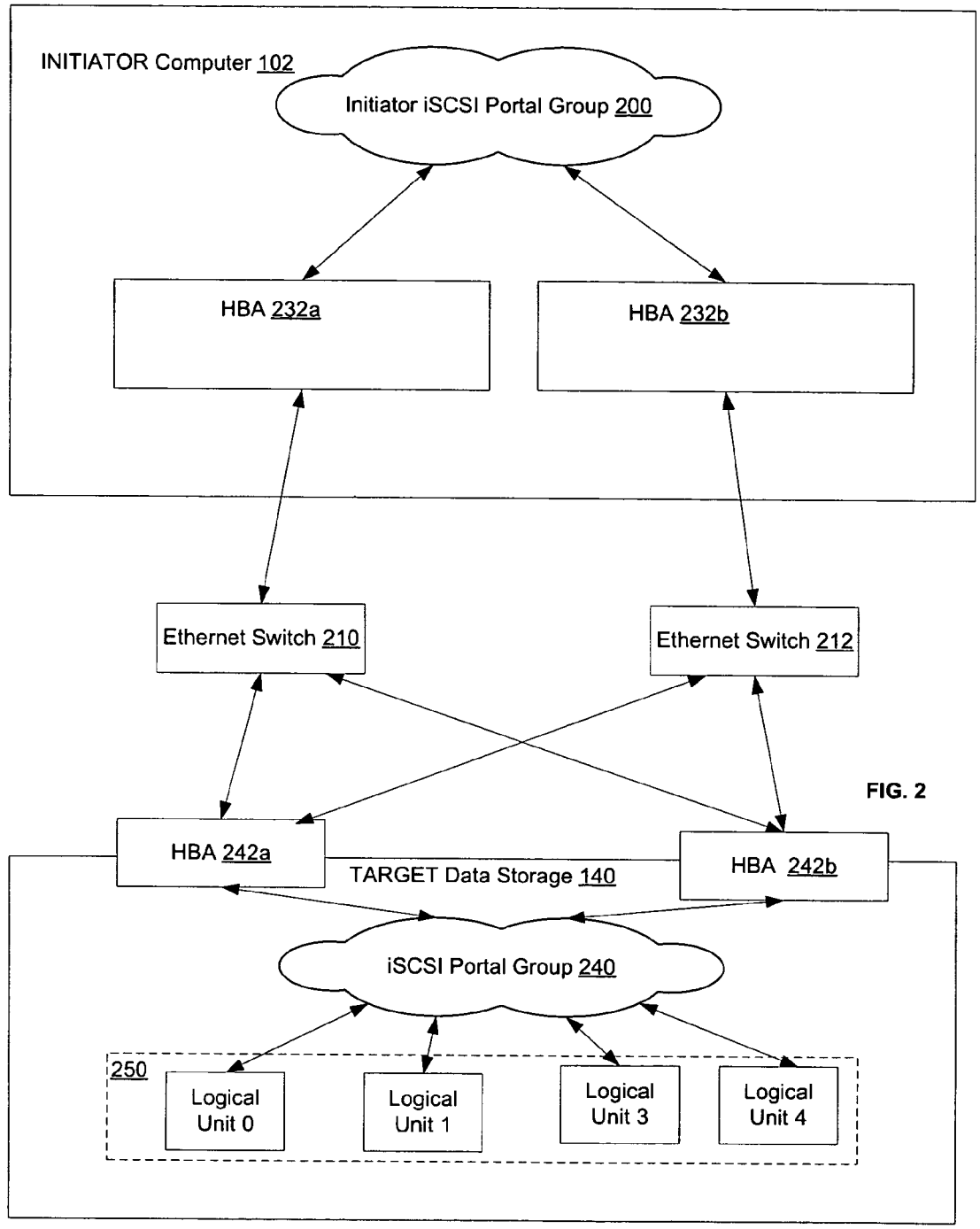
FIG. 2 illustrates operations to manage communications between devices in accordance with embodiments.

FIG. 2 illustrates an iSCSI Storage Area Network (SAN) configuration and a load balancing logical model in accordance with certain embodiments. In FIG. 2, a computer 102 acts as an initiator, while data storage 140 acts as a target. The computer 102 includes an initiator iSCSI portal group 200 connected to HBAs 232a, 232b. HBA 232a is connected via Ethernet switch 210 to HBAs 242a, 242b. HBA 232b is connected via Ethernet switch 212 to HBAs 242a, 242b. The HBAs 242a, 242b are connected to an iSCSI target portal group 240, which is connected to logical units 250.

An iSCSI SAN configuration provides the ability to balance I/O workload across multiple HBA data paths. This configuration has multiple HBAs to distribute SCSI request flow across the data paths. In particular, FIG. 2 depicts an example of a SAN configuration that has load balancing capabilities. Unlike conventional SCSI protocol that requires a high level SCSI protocol to carry out synchronization with load balancing, iSCSI carries out the synchronization in the transport layer protocol itself. iSCSI uses a Portal Group defining an iSCSI session consisting of multiple connections across multiple HBAs. In certain embodiments, there are no requirements for load balancing for the target data storage 140, except to support iSCSI Portal Group. The initiator computer 102 issues SCSI/iSCSI requests, monitors data flow, and with the load balancing component 122, distributes requests across HBA data paths as appropriate. An HBA data path may be described as a connection from an initiator to a target. In certain embodiments, the HBA data path may be described as a TCP/IP connection for which an iSCSI session has been started.

Figure 3:
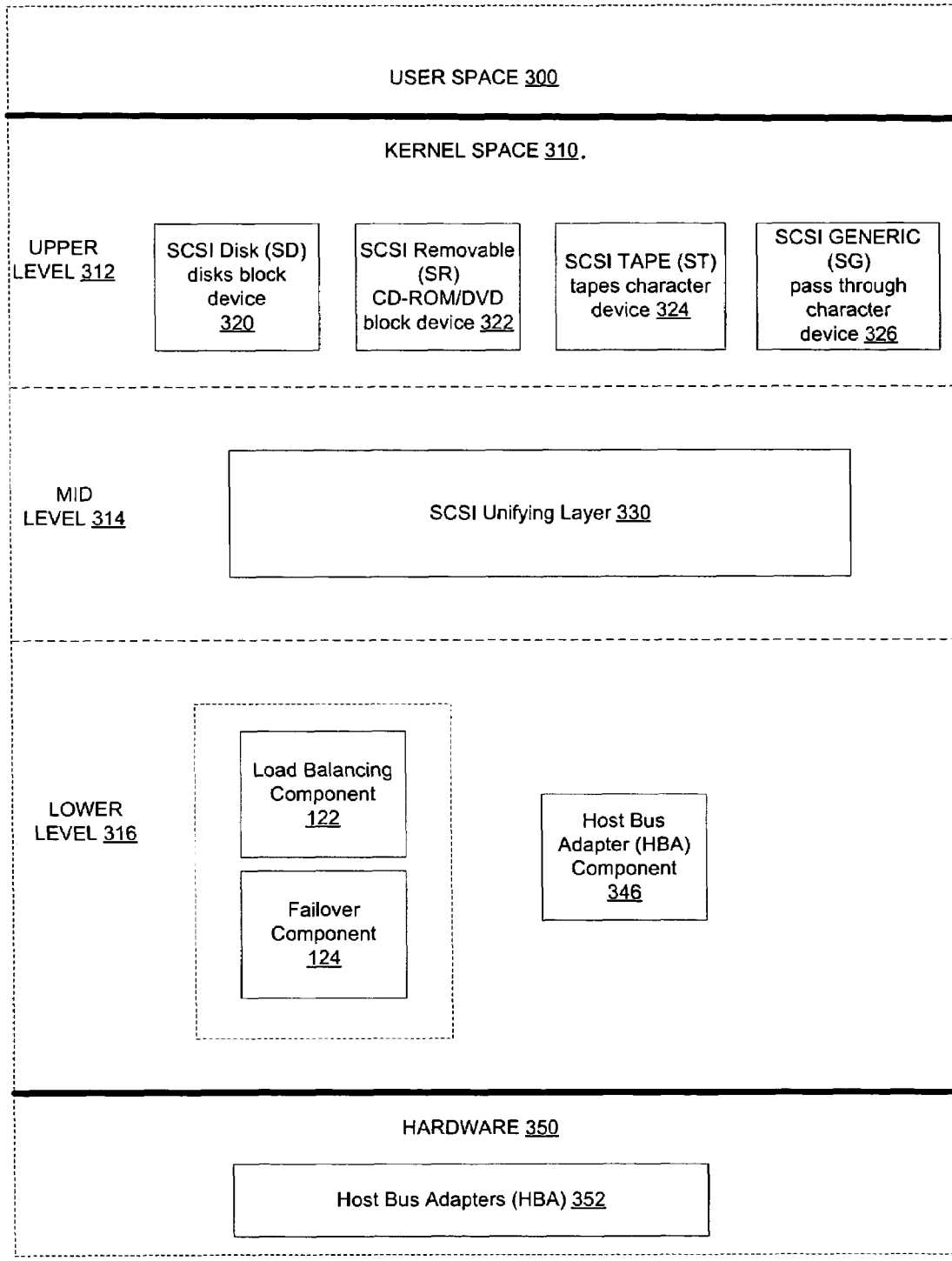
FIG. 3 illustrates three levels of drivers for a SCSI subsystem in accordance with certain embodiments.

FIG. 3 illustrates three levels of drivers for a SCSI subsystem in accordance with certain embodiments. In certain embodiments, FIG. 3 represents a Linux®-based SCSI subsystem with load balancing capabilities. In FIG. 3, a user space 300, a kernel space 310, and hardware 350 are illustrated. The kernel space 310 may be viewed as three levels: an upper level 312, a mid level 314, and a lower level 316. The upper level 312 is closest to the user/kernel interface, while the lower level 316 is closest to the hardware 350. The upper level 312 includes a SCSI disk (SD) disks block device 320, a SCSI removable (SR) CD-ROM/DVD block device 322, a SCSI tape (ST) tapes character device 324, and a SCSI generic (SG) pass through character device 326. The mid level 314 includes a SCSI unifying layer 330. With certain embodiments, the lower level 316 includes a load balancing component 122 and failover component 124. The lower level 316 also includes a host bus adapter component 346. The upper layer 312 and middle layer 314 are unaware that the lower level 316 includes components that support anything other than a normal SCSI HBA (Host Bus Adapter).

In certain embodiments, the load balancing component 122 acts as a functional SCSI wrapper for the iSCSI Host Bus Adapter component 346. Requests to the load balancing component 122 are normal SCSI requests, and results returned are normal SCSI results.

In certain embodiments, the failover component 124 acts as a functional SCSI wrapper for the iSCSI Host Bus Adapter component 346. Requests to the failover component 124 are normal SCSI requests, and results returned are normal SCSI results.

Embodiments provide a load balancing component 122 that improves system throughput by utilizing the parallel data paths to the same storage target simultaneously. The load balancing component 122 distributes the I/O from a computing system (e.g., a server computer) among network adapters in a configured team of network adapters (e.g., Host Bus Adapters). This results in faster I/O operations and reduces data path congestion in shared storage (e.g., multiple-server) configurations. Additionally, the load balancing component 122 maximizes the available bandwidth for the shared storage configurations. Embodiments also provide both static load balancing and dynamic load balancing.

Figure 4:
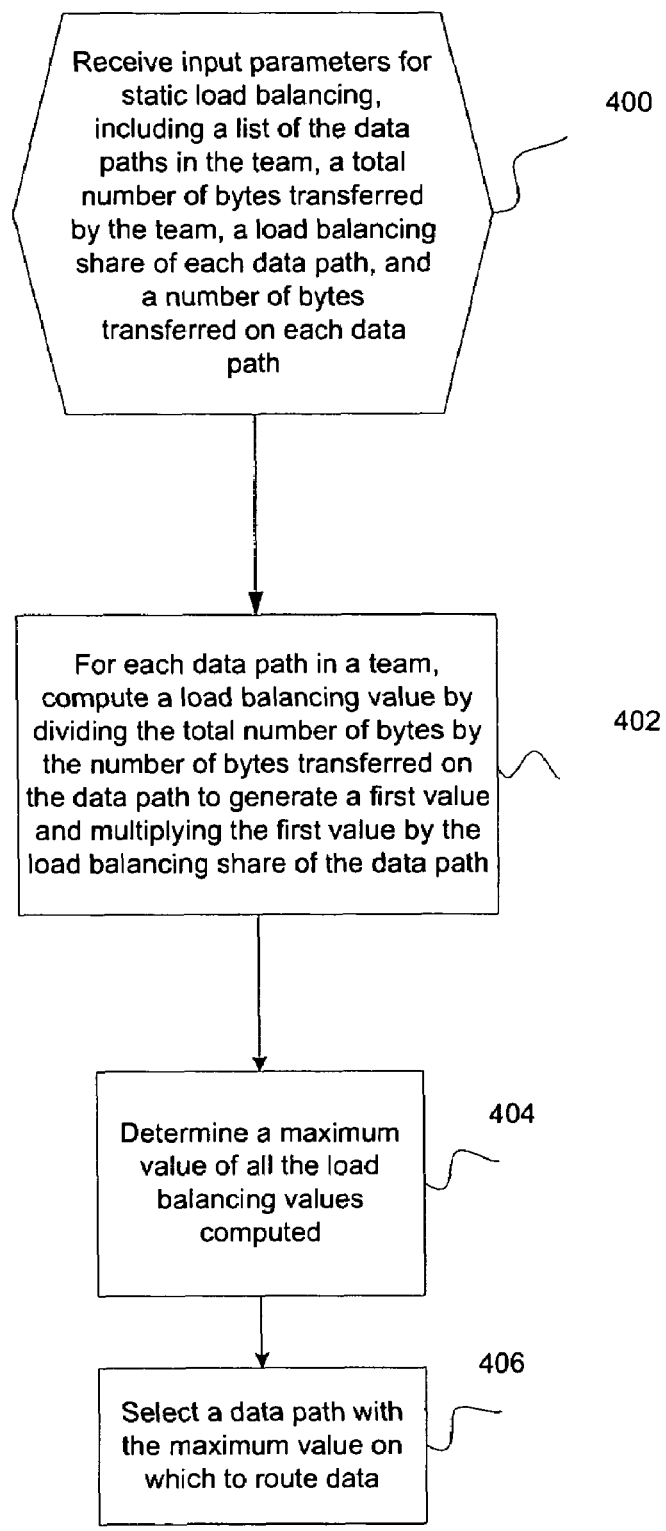
FIG. 4 illustrates operations for static load balancing in accordance with certain embodiments.

FIG. 4 illustrates operations for static load balancing in accordance with certain embodiments. Control begins at block 400 with receipt by the load balancing component 122 of input parameters for static load balancing. The input parameters may include, for example, a list of the data paths in the team, a total number of bytes transferred by the team (also referred to as "TotalTeamBytes"), a load balancing share of each data path (also referred to as "LoadBalancingShare"), and a number of bytes transferred on each data path (also referred to as "DataPathBytes"). The TotalTeamBytes may be described as a total number of bytes sent across all data paths for one or more commands, while DataPathBytes may be described as a number of bytes sent across a particular data path so far for one or more commands. For static load balancing, the load balancing component 122 assumes that each data path in a team has an associated value, which will be referred to as a "load balancing share" for ease of reference, that represents the percentage of a total I/O (read or write) workload that a given data path in the team can take. The overall sum of the load balancing share values for the team is 100%.

In block 402, the load balancing component 122 computes a load balancing value for each data path in a team. The load balancing value is computed by dividing the total number of bytes by the number of bytes transferred on the data path to generate a first value and multiplying the first value by the load balancing share of the data path. In block 404, the load balancing component 122 determines a maximum value of all the load balancing values that have been computed for the data paths in a team. If multiple data paths have the same maximum value, one of the data paths may be selected using any one of various techniques (e.g., the first data path found with that value is selected or the data path that has not recently been selected is selected). In block 406, the load balancing component 122 selects a data path with the maximum value on which to route data.

With static load balancing, when a new SCSI command (read/write) comes from the SCSI mid level 314, the load balancing component 122 implements a static load balancing technique to determine a data path on which to send the command. The load balancing component 122 attempts to maintain a specified read or write load balancing share for each of the data paths. The load balancing share may be specified by, for example, a system administrator or other user.

In certain embodiments, the load balancing share for each data path may be different for reads and writes of data. That is, a data path acting as a read data path may have a different load balancing share than when the data path is acting as a write data path.

Figure 5:
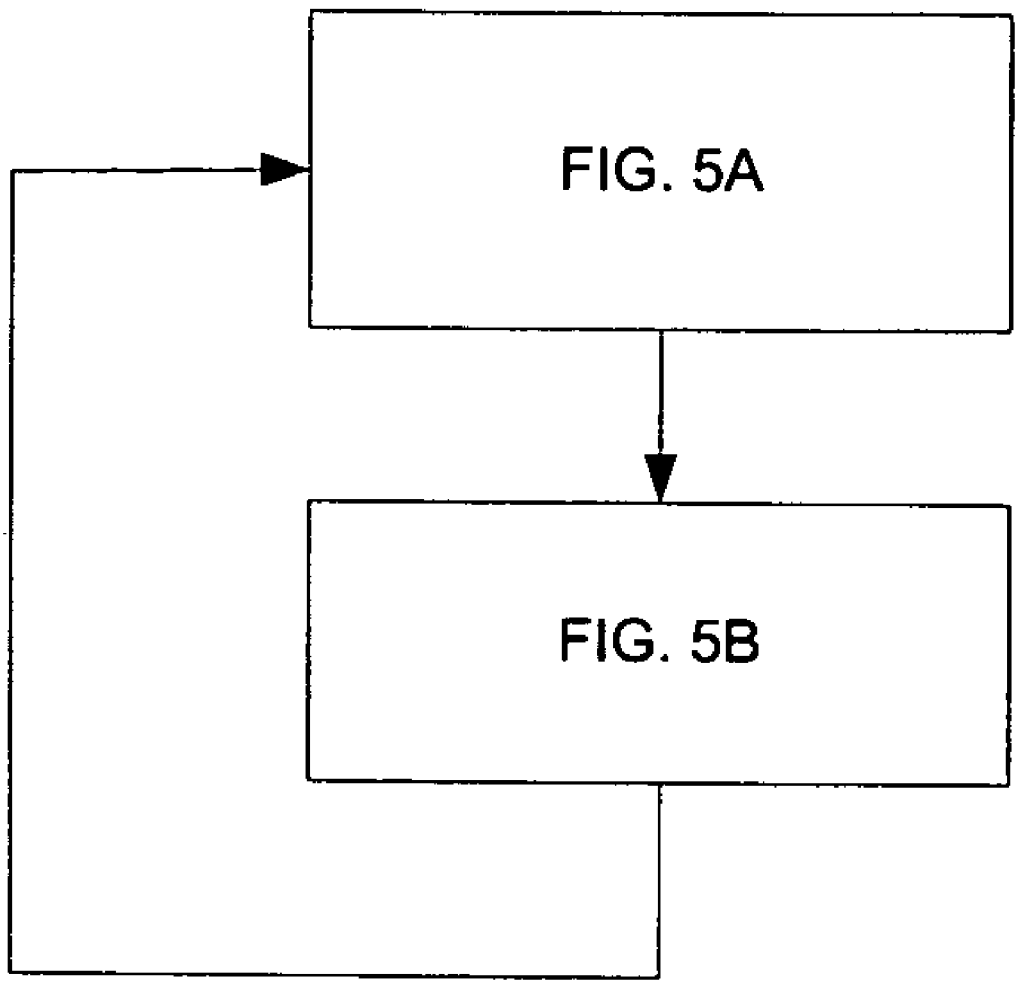
FIGS. 5A and 5B (whose relationship is shown in FIG. 5) illustrate operations for dynamic load balancing in accordance with certain embodiments.
Figure 5A:
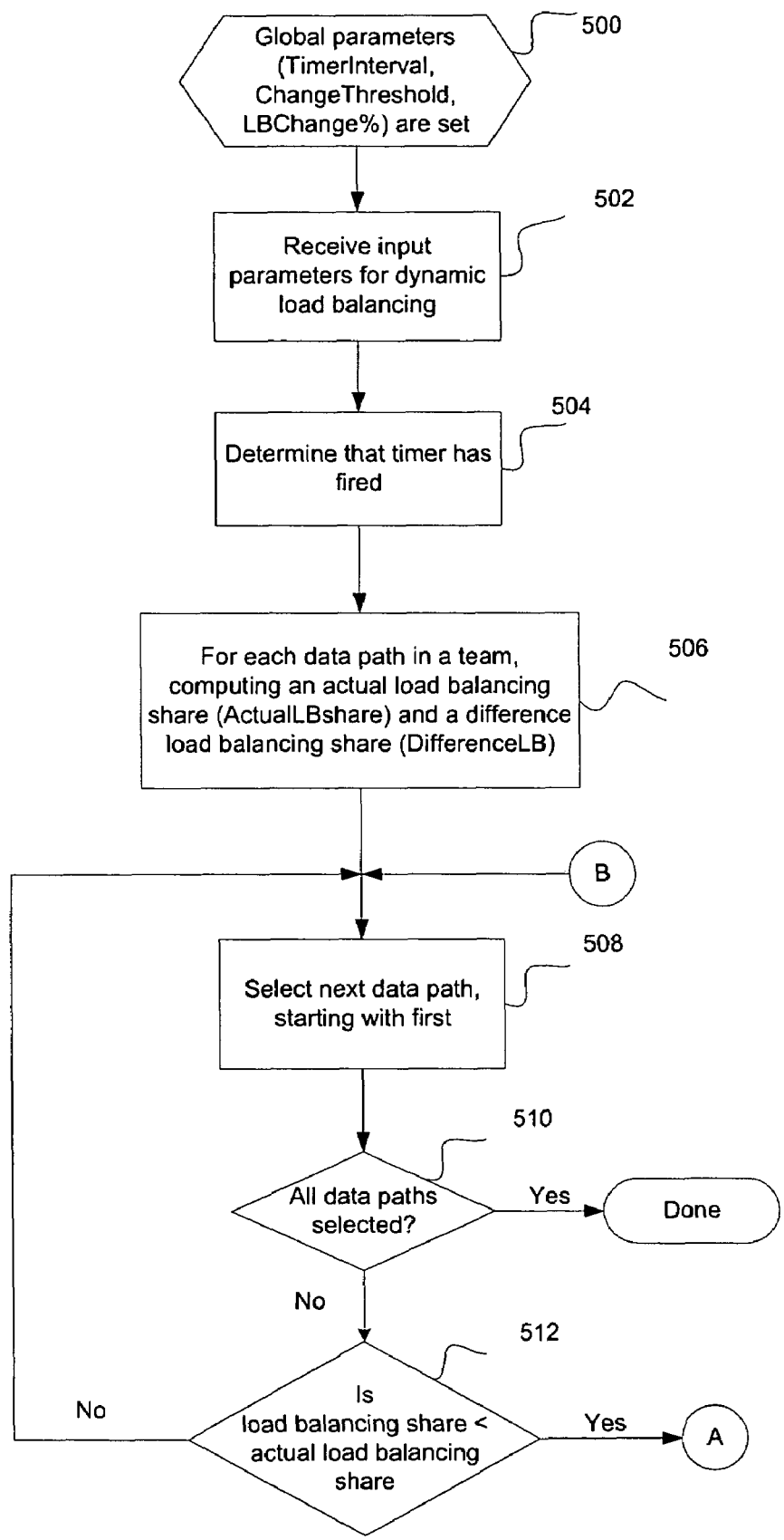
Figure 5B:
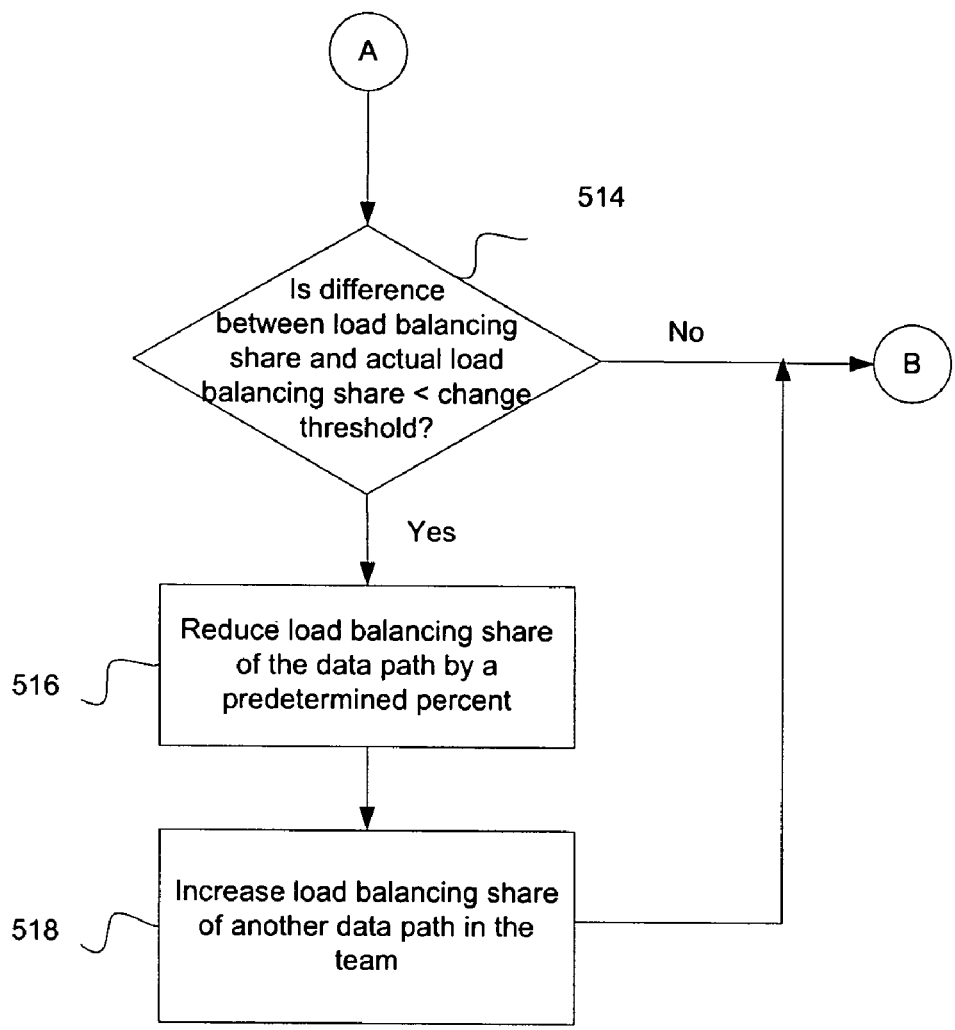

The following is sample pseudocode for static load balancing and is calculated separately for read and write data paths in accordance with certain embodiments:

1. For each data path in a team compute a load balancing share: LoadBalancingValue=(TotalTeamBytes/DataPathBytes)*LoadBalancingShare
2. Find a maximum value of all LBvalues computed:
For all data paths in the team,
  If (MaxLBvalue<LBvalue) for a data path,
    MaxLBvalue=LBvalue of the data path
  End For loop
3. Send SCSI command on the data path with maximum value of LBvalue:
For all data paths in the team,
  If (MaxLBvalue=LBvalue) for a data path,
    send SCSI command on this data path
  End For loop FIGS. 5A and 5B (whose relationship is shown in FIG. 5) illustrate operations for dynamic load balancing in accordance with certain embodiments. Dynamic load balancing ensures that a single data path does not become congested, as long as there is available bandwidth on other data paths, by dynamically adjusting I/O workload among data paths. Thus, dynamic load balancing ensures that a storage system's total available bandwidth is readily accessible by clients. In FIG. 5, it can be seen that processing may flow from FIG. 5A to FIG. 5B and then back to FIG. 5A. In FIG. 5A, control begins at block 500 with global parameters being set by, for example, a system administrator or other user. In particular, dynamic load balancing uses three global parameters: a timer interval value (also referred to as "TimerInterval") that determines when a timer (e.g., a kernel timer) fires in order to dynamically set the load balancing parameters based on the current congestion; a change threshold value (also referred to as "ChangeThreshold"), which is a value to determine whether congestion on a data path exists; and a load balancing change percent value (also referred to as "LBChange %"), that is used to determine how much of the load balancing share to decrease for the congested data path (if congestion exists).

In block 502, the load balancing component 122 receives input parameters for dynamic load balancing. The input parameters may include, for example, a list of the data paths in the team, a total number of bytes transferred by the team in a last time frame, a load balancing share of each data path in the last time frame, and a number of bytes transferred on each data path in the last time frame.

In block 504, the load balancing component 122 determines that the timer has fired. The load balancing component 122 implements dynamic load balancing when the timer fires every "TimerInterval" value. At the TimerInterval time, load balancing shares are recomputed. In certain embodiments, during the length of the interval, a SCSI command is directed on a data path based on the recomputed values using static load balancing.

In block 506, the load balancing component 122 computes an actual load balancing share (also referred to as "ActualLBShare") and a difference load balancing value (also referred to as "DifferenceLB") for each data path in the team for the selected data path. The actual load balancing share is computed by dividing the number of bytes transferred on the data path by the total number of bytes to generate a first value and multiplying the first value by 100. The difference load balancing value is computed by subtracting the load balancing share from the actual load balancing share.

In block 508, the load balancing component 122 selects the next data path in a team, starting with the first data path. In block 510, the load balancing component 122 determines whether all data paths have been selected. If so, processing is done, otherwise, processing continues to block 512.

In block 512, the load balancing component 122 determines whether the load balancing share is less than the actual load balancing share for the selected data path. If so, processing continues to block 514 (FIG. 5B), otherwise, processing loops back to block 508. Thus, if the load balancing share of the selected data path is less than the actual load balancing share, then the load balancing share of the data bath may be adjusted depending on other factors. If the load balancing share of the selected data path is equal to or greater than the actual load balancing share, the load balancing share of the data path is not adjusted.

In block 514, the load balancing component 122 determines whether the difference between load balancing share and the actual load balancing share is less than a change threshold. If so, processing continues to block 516, otherwise, processing loops back to block 508 (FIG. 5A). In block 516, the load balancing component 122 reduces the load balancing share of the data path by the load balancing change percent. In block 518, the load balancing component 122 increases the load balancing share of another data path in the team. In certain embodiments, the load balancing component 122 selects a data path with a lowest value of DifferenceLB, where lowest refers to inclusion of −ve numbers, and, if multiple data paths have the same lowest value of DifferenceLB, the load balancing component 122 selects a data path from this group with a highest ActualLBShare value. For example, if there are three data paths, having DifferenceLB values of −15%, 15%, and 10%, respectively, then, the load balancing component 122 selects the data path with the −15% DifferenceLB value and increases the load balancing share of this selected data path. Then, processing loops back to block 508 (FIG. 5A).

Note that the load balancing share of one data path is decreased (block 516), therefore, in order for the load balancing shares of all data paths to be 100 percent, the load balancing share of another data path is increased (block 518).

The following is sample pseudocode for dynamic load balancing in accordance with certain embodiments:
1. When the kernel timer fires,
   For all data paths in the team compute:
      ActualLBshare=(DataPathBytes/TotalTeam
         Bytes)*100
      DifferenceLB=(ActualLBshare−LoadBalancingShare)
   End for loop
2. For each of the data paths in the team,
   If ((LoadBalancingShare<actualLBshare) and
      (DifferenceLB>ChangeThreshold)),
      Reduce LoadBalancingShare of the DataPath by "LBChange %" value Select data path with lowest value of DifferenceLB, where lowest refers to inclusion of −ve numbers, and, if multiple data paths have the same lowest value of DifferenceLB, select data path from this group with highest ActualLBShare
      Increase LoadBalancingShare of the selected data path
3. Return with the updated LoadBalancingShare for all the data paths With dynamic load balancing, the static load balancing technique may be implemented once the LoadBalancingShares have been computed at the "TimerInterval value". In certain embodiments, switching between static and dynamic load balancing is performed by a user. If a switch occurs, the LoadBalancingShares may be recomputed.

Thus, the load balancing component 122 reduces data path congestion in shared storage networks, maximizes available bandwidth for the entire system, and leads to faster I/O operations.

In certain embodiments, the static and dynamic load balancing techniques may be deployed in a Linux® driver for a iSCSI Host Bus Adapter. The addition of this technology to any iSCSI Linux® driver increases the overall throughput in an iSCSI SAN and reduces data path congestion in shared storage networks. In certain embodiments, the load balancing component 122 is a load balancing driver, and both the load balancing driver and the iSCSI driver may exist as a single driver within a Linux® SCSI subsystem.

Embodiments also provide a failover component 124 that provides a high-availability failover technique that utilizes the parallel data paths to the same storage target to provide an iSCSI networking environment a reliable connectivity between storage servers in the face of critical-mission tasks and possible component or network connection failures.

There are a number of possible cases of failure in a SAN configuration, including, for example: 1) connection failure in the path from the initiator to a specific iSCSI target; 2) failure of a network adapter (e.g., HBA) on the initiator side; and, 3) failure of a network adapter (e.g., HBA) or a disk on the target side. Embodiments are able to handle these failure cases. In particular, even failure of a network adapter (e.g., HBA) or a disk on the target side may be treated as a connection failure.

Another possible case of failure is a connection failure (e.g., connection is lost between computer 102 and Ethernet switches 210, 212). However, the failover component 124, in combination with other technologies (e.g., Redundant Array of Independent Disks (RAID) and clustering software provided by the host operating system), and a high-availability target storage system, covers this case of failure.

Embodiments allow for both failover only mode and failover and load balancing mode. For example, an iSCSI Linux® driver may run in either failover only mode or failover and load balancing mode. Network adapter teaming is used for both failover and load balancing. Also, multiple network adapter teams may share a network adapter, and all network adapter data paths are inside a network adapter team, including a single data path session.

Figure 6:
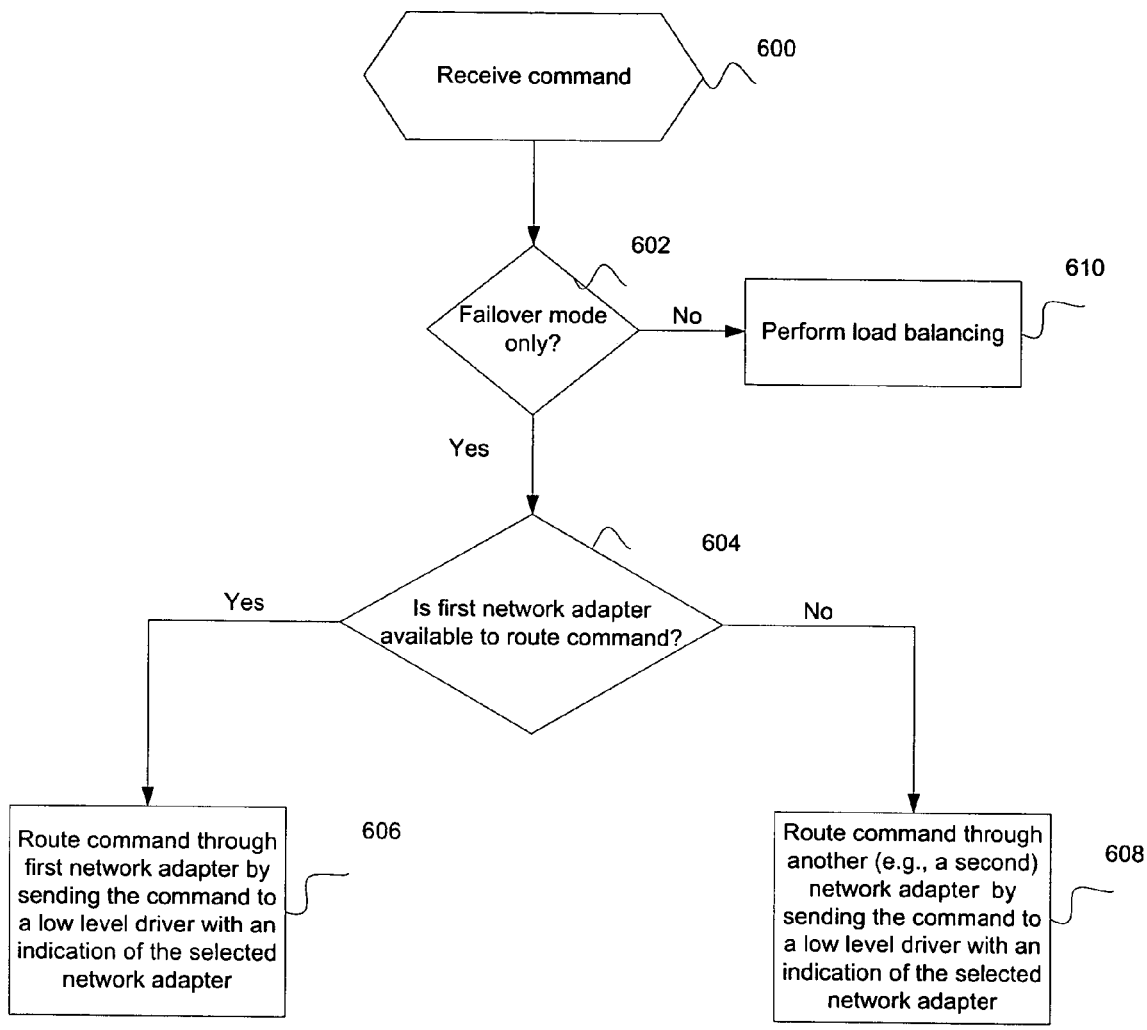
FIG. 6 illustrates operations for failover processing in accordance with certain embodiments.

FIG. 6 illustrates operations for failover processing in accordance with certain embodiments. Control begins at block 600 with receipt by the failover component 124 of a command (e.g., a SCSI_Host command). In block 602, the failover component 124 determines whether the mode is failover mode only. If so, processing continues to block 604, otherwise, processing continues to block 610. In block 604, the failover component 124 determines whether a first network adapter is available to route data. If so, processing continues to block 606, otherwise, processing continues to block 608. In block 606, the failover component 124 routes the command through the first network adapter by sending the command to a low lever driver with an indication of the selected network adapter. In block 608, the failover component 124 routes the command through another (e.g., a second) network adapter by sending the command to a low lever driver with an indication of the selected network adapter. Thus, if one network adapter fails, the failover component 124 re-routes commands to another network adapter. Additionally, if the failover component 124 determines that the mode is not failover only mode, then, the failover and load balancing components 124, 122 perform load balancing (block 610). Thus, when more than one network adapter is available to route commands, load balancing may be performed among the available network adapters.

Figure 7:
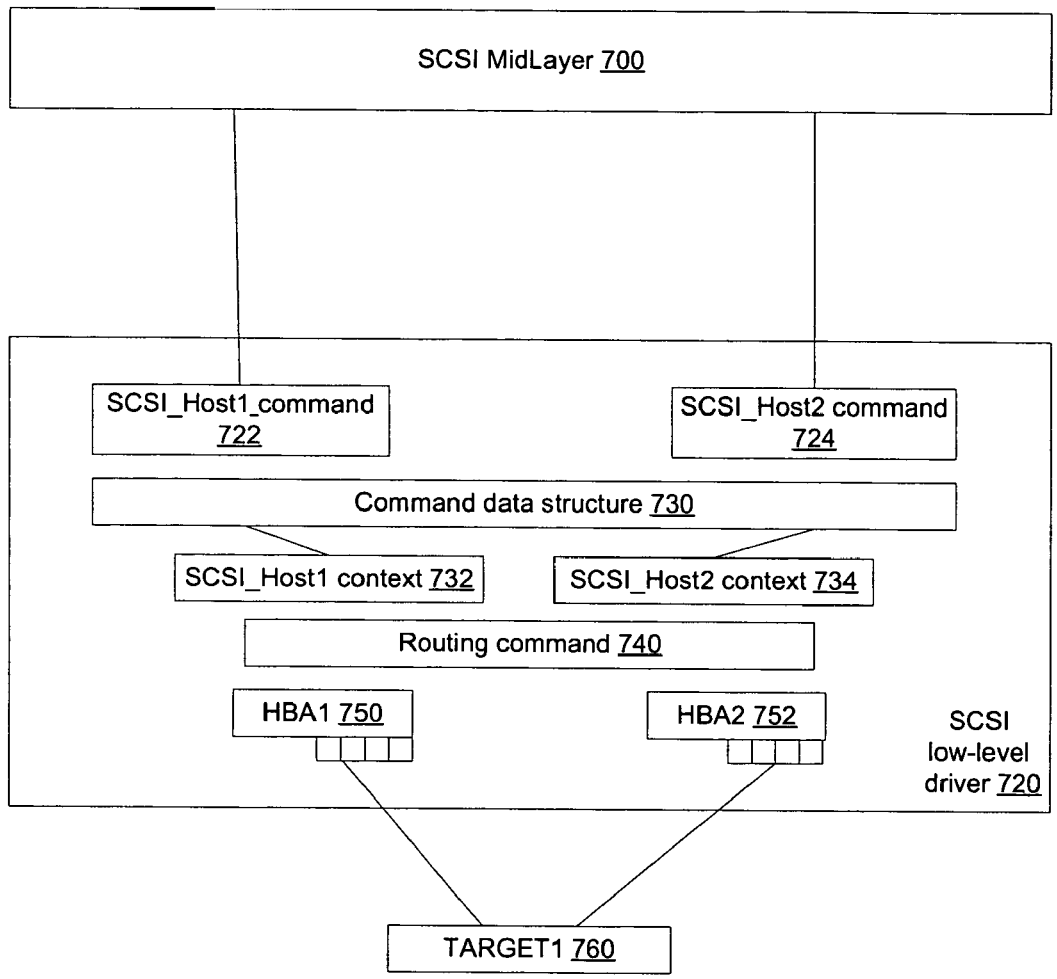
FIG. 7 illustrates a SCSI domain configuration in accordance with certain embodiments.

FIG. 7 illustrates a SCSI domain configuration in accordance with certain embodiments. Although examples herein may refer to an HBA, embodiments are applicable to any type of network adapter. In FIG. 7, the focus is on the initiator side of a SCSI domain and represents implementation of both failover and load balancing. In FIG. 7, there are two HBAs 750, 752 on the initiator side, and there is one logical target 760. There are two connections, one from each HBA 750, 752 to the target 760. In particular, the iSCSI session established in this SCSI domain can be viewed as the initiator side having a team of HBA1 750 and HBA2 752, where HBA1 750 is primary and HBA2 752 is secondary, and as the target side having target1 760.

In failover mode, the primary data path to target1 760 flows over HBA1 750, while HBA2 752 is designated as the secondary failover data path. An initiator in a portal group logs into the target1 760 by using a pre-assigned Inter-Session IDentifier (ISID) defining the session and receives a Target Session IDentifier (TSID). One or more connections are established for the session for the secondary data path. Thus, both HBAs are logged into target1 760 with HBA1 750 configured as primary and actively accessing target1 760. HBA2 752, marked as secondary, remains quiescent with respect to target1 760. However, some activity occurs on the quiescent HBA2 752, such as TCP or iSCSI traffic that keeps the connection alive. If the data flow to the target1 760 port attached through the primary HBA1 750 fails, the failover component 124 instantly redirects data flow through the secondary HBA2 752. Thus, as long as any data path exists that maintains connectivity between an iSCSI HBA and a remote target, the data flow to the remote target continues in an uninterrupted fashion.

In particular, commands from the host operating system (e.g., SCSI_Host1 command 722, SCSI_Host2 command 724) are stored in a command data structure 730 for processing by the failover component 124. The failover component 124 maintains a context for each host (e.g., SCSI_Host1 context 732, SCSI_Host2 context 734). The failover component 124 retrieves a command from command data structure 730, determines an HBA to be used for routing the command to target1 760, and invokes the routing command 740, which routes the command to the hardware (i.e., to the determined HBA 750 or 752).

In failover and load balancing mode, a secondary network adapter (e.g., HBA2 752) actively participates in maintaining iSCSI traffic and does not remain quiescent with respect to the target (e.g., target1 760). The failover and load balancing components 124, 122 work together to distribute SCSI command flow among the network adapters (e.g., HBAs 750, 752) according to configurable load balancing shares for each team member (e.g., in case of static load balancing). In case only one team member remains functional in a team, failover and load balancing components 124, 122 enter failover mode and direct all iSCSI traffic over the healthy network adapter. Load balancing shares may be used to control switching between failover mode and failover and load balancing mode. In particular, if one data path has a 100 percent load balancing share, then failover mode is used.

Failover may be connection based or session based. In connection based failover, the connections in a team belong to one session. In session based failover, a number of different sessions belong to one team.

Figure 8:
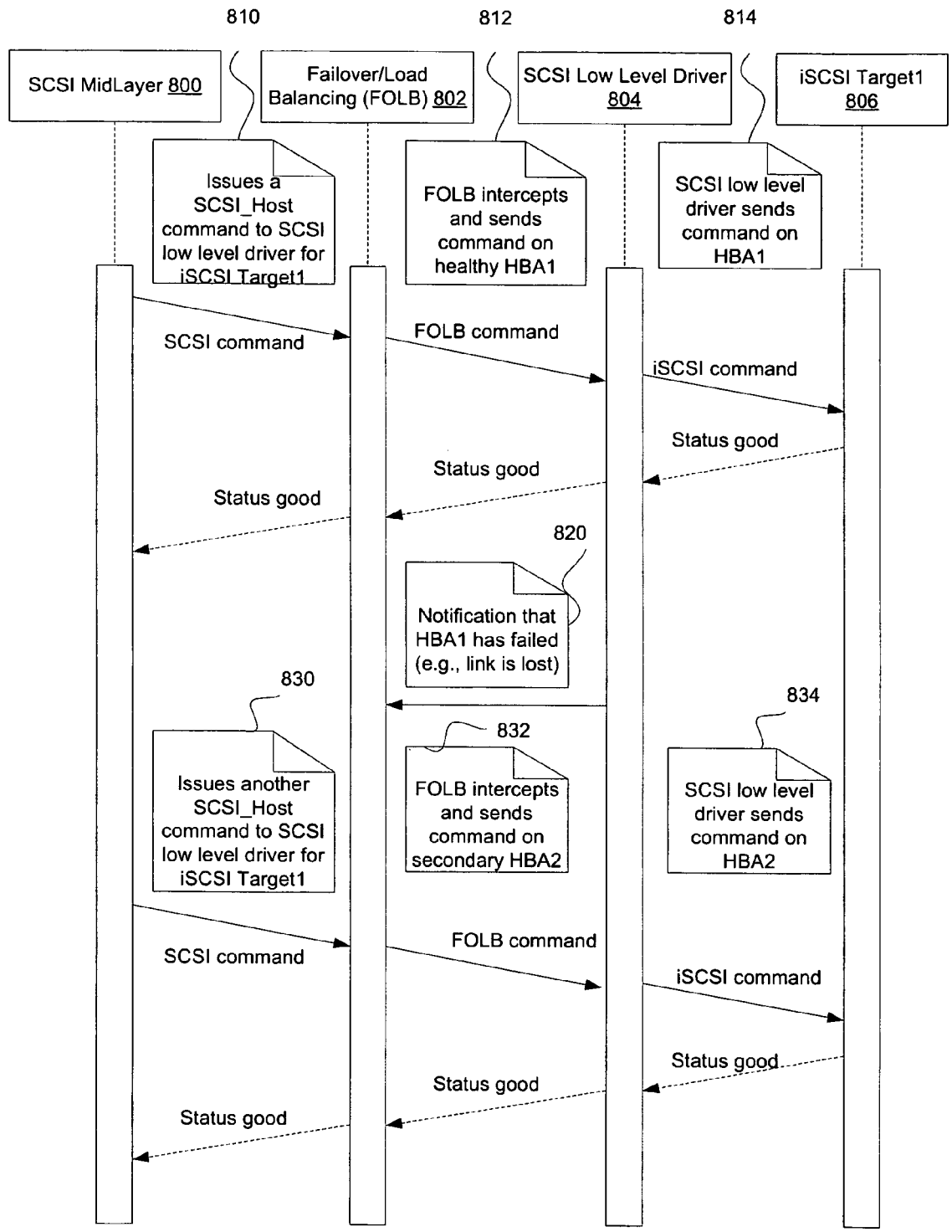
FIG. 8 illustrates a sequence of events that show failover processing in accordance with certain embodiments.

FIG. 8 illustrates a sequence of events that show failover processing in accordance with certain embodiments. A SCSI midlayer 800 issues a SCSI_Host command to a SCSI low level driver 804 for iSCSI target1 806 (block 810). The failover/load balancing components 802 intercept the command and send the command on healthy HBA1 (block 812). A SCSI low level driver 812 receives the command and sends the command on HBA1 (block 814). The command is sent by HBA1 to iSCSI target1 806.

The iSCSI target1 806 returns a status indicator of "good" to the SCSI low level driver 804, which forwards the status indicator of "good" to the failover/load balancing components 802, which, in turn, forward the status indicator of "good" to the SCSI mid layer 800.

In this example, the failover/load balancing components 802 receive a notification from the SCSI low level driver 804 that HBA1 has failed, for example, due to a lost link between the SCSI low level driver 804 and HBA1 (block 820). The SCSI midlayer 800 issues another SCSI_Host command to a SCSI low level driver 804 for iSCSI target1 806 (block 830). The failover/load balancing components 802 intercept the command and send the command on secondary HBA2 (block 832). A SCSI low level driver 812 receives the command and sends the command on HBA2 (block 834). The command is sent by HBA2 to iSCSI target1 806.

The iSCSI target1 806 returns a status indicator of "good" to the SCSI low level driver 804, which forwards the status indicator of "good" to the failover/load balancing components 802, which, in turn, forward the status indicator of "good" to the SCSI mid layer 800.

Thus, embodiments increase the reliability of the storage network, and provide an easy mechanism to integrate load balancing and failover into the Linux® iSCSI driver. Moreover, one SCSI low-level driver may be used. In particular, the failover and load balancing features may be integrated with the SCSI low-level driver without having to have two separate drivers. In certain embodiments, the failover driver and the iSCSI driver may exist as a single driver within the Linux® SCSI subsystem. This solution also enables integrating other features, such as load balancing, into the iSCSI driver.

Linux is a registered trademark of Linus Torvalds in the United States and/or other countries.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration. Additionally, the devices, adapters, etc., may be implemented in one or more integrated circuits on the adapter or on the motherboard.

The illustrated operations of FIGS. 4, 5A, 5B, and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for static load balancing, comprising:
    receiving input parameters of a list of data paths in a network adapter team, a total number of bytes transferred across the data paths in the network adapter team, a load balancing share of each data path, and a number of bytes transferred on each data path, wherein the load balancing share represents a percentage of a total read or write workload that a given data path in the network adapter team can take, wherein the load balancing share for at least one data path is different for a read workload and a write workload, wherein the load balancing share is specified by a user;
    for each data path in a network adapter team, computing a load balancing value by:
        dividing the total number of bytes by the number of bytes transferred on the data path to generate a first value; and
        multiplying the first value by the load balancing share of the data path;
    determining a maximum value of the computed load balancing values; and
    selecting a data path with the maximum value for use in routing data.

2. A method for dynamic load balancing, comprising:
    receiving input parameters of a list of data paths in the network adapter team, a total number of bytes transferred by the network adapter team in a last time frame, a load balancing share of each data path in the last time frame, and a number of bytes transferred on each data path in the last time frame;
    computing an actual load balancing share for each data path in a network adapter team by dividing the number of bytes transferred on that data path by a total number of bytes transferred by the network adapter team in the last time frame;
    computing a difference load balancing value for each data path in the network adapter team by subtracting the load balancing share of the data path from the actual load balancing share of the data path;
    for each data path,
        determining whether the load balancing share for the data path in the last time frame is less than the actual load balancing share for the data path; and
        in response to determining that the load balancing share is less than the actual load balancing share, adjusting the load balancing share of the data path by:
            determining whether a difference between the load balancing share and the actual load balancing share is less than a change threshold; and
            in response to determining that the difference between the load balancing share and the actual load balancing share is less than the change threshold,
                reducing the load balancing share of the data path;
                selecting another data path based on the difference load balancing value of each data path; and
                increasing the load balancing share of the selected data path.

3. The method of claim 2, wherein the load balancing share of the data path in the network adapter team with a lowest difference load balancing value is increased, and wherein, if multiple data paths have the lowest difference load balancing value, a data path from the multiple data paths with a highest actual load balancing share is increased.

4. The method of claim 2, wherein the actual load balancing share and the difference load balancing value are computed when a timer fires.

5. The method of claim 2, further comprising:
    receiving a timer interval value, a change threshold value, and a load balancing change percent value.

6. A method for failover processing, comprising:
    under control of a failover component,
        intercepting a command issued to a target;
        determining whether a mode is failover mode or failover and load balancing mode, wherein a first network adapter in a network adapter team is used to route data to the target and a second network adapter in the network adapter team is quiescent with respect to the target in the failover mode, and wherein the first network adapter and the second network adapter are used to route data to the target in the failover and load balancing mode;
        in response to determining that the mode is the failover and load balancing mode, working with a load balancing component to perform load balancing based on load balancing shares of data paths in the network adapter team;
        determining whether the command is capable of being routed through a first network adapter in the network adapter team to the target;
        routing the command through the first network adapter in response to determining that the command is capable of being routed through the first network adapter;
        routing the command through a second network adapter in the network adapter team in response to determining that the command is not capable of being routed through the first network adapter; and
        determining whether to switch between the failover mode and the failover and load balancing mode based on the load balancing shares of data paths between the network adapters in the network adapter team and the target, wherein, when one data path has a hundred percent load balancing share, then failover mode is used.

7. The method of claim 6, wherein the determination of whether a command is capable of being routed through a first network adapter determines whether an indication that the first network adapter failed was received.

8. The method of claim 6, wherein routing the command further comprises:
    forwarding the command to a low level driver with an indication of the selected network adapter.

9. The method of claim 6, further comprising:
    performing the load balancing between the first network adapter and the second network adapter when both network adapters are available.

10. A system for static load balancing, comprising:
    multiple data paths forming a network adapter team; and
    circuitry, in a load balancing component that is coupled to a bus, operable to:
        receive input parameters of a list of data paths in a network adapter team, a total number of bytes transferred across the data paths in the network adapter team, a load balancing share of each data path, and a number of bytes transferred on each data path, wherein the load balancing share represents a percentage of a total read or write workload that a given data path in the network adapter team can take, wherein the load balancing share for at least one data path is different for a read workload and a write workload, wherein the load balancing share is specified by a user;

for each data path in a network adapter team, compute a load balancing value by:
  dividing the total number of bytes by the number of bytes transferred on the data path to generate a first value; and
  multiplying the first value by the load balancing share of the data path;

determine a maximum value of the computed load balancing values; and select a data path with the maximum value for use in routing data.

11. A system for dynamic load balancing, comprising:
multiple data paths forming a network adapter team; and
circuitry, in a load balancing component that is coupled to a bus, operable to:
  receive input parameters of a list of data paths in the network adapter team, a total number of bytes transferred by the network adapter team in a last time frame, a load balancing share of each data path in the last time frame, and a number of bytes transferred on each data path in the last time frame;
  compute an actual load balancing share for each data path in a network adapter team by dividing the number of bytes transferred on that data path by a total number of bytes transferred by the network adapter team in the last time frame;
  compute a difference load balancing value for each data path in the network adapter team by subtracting the load balancing share of the data path from the actual load balancing share of the data path;
  for each data path,
    determine whether the load balancing share for the data path in the last time frame is less than the actual load balancing share for the data path; and
    in response to determining that the load balancing share is less than the actual load balancing share, adjust the load balancing share of the data path by:
      determining whether a difference between the load balancing share and the actual load balancing share is less than a change threshold; and
      in response to determining that the difference between the load balancing share and the actual load balancing share is less than the change threshold,
        reducing the load balancing share of the data path;
        selecting another data path based on the difference load balancing value of each data path; and
        increasing the load balancing share of the selected data path.

12. The system of claim 11, wherein the load balancing share of the data path in the network adapter team with a lowest difference load balancing value is increased, and wherein, if multiple data paths have the lowest difference load balancing value, a data path from the multiple data paths with a highest actual load balancing share is increased.

13. The system of claim 11, wherein the actual load balancing share and the difference load balancing value are computed when a timer fires.

14. The system of claim 11, wherein the circuitry is operable to:
  receive a timer interval value, a change threshold value, and a load balancing change percent value.

15. A system for failover processing, comprising:
a first network adapter in a network adapter team;
a second network adapter in the network adapter team;
a failover component;
a load balancing component; and
circuitry, in the failover component coupled to a bus, operable to:
  intercept a command issued to a target;
  determine whether a mode is failover mode or failover and load balancing mode, wherein the first network adapter is used to route data to the target and the second network adapter is quiescent with respect to the target in the failover mode, and wherein the first network adapter and the second network adapter are used to route data to the target in the failover and load balancing mode;
  in response to determining that the mode is the failover and load balancing mode, work with a load balancing component to perform load balancing based on load balancing shares of data paths in the network adapter team;
  determine whether the command is capable of being routed through the first network adapter to the target;
  route the command through the first network adapter in response to determining that the command is capable of being routed through the first network adapter;
  route the command through the second network adapter in response to determining that the command is not capable of being routed through the first network adapter; and
  determine whether to switch between the failover mode and the failover and load balancing mode based on the load balancing shares of data paths between the network adapters in the network adapter team and the target, wherein, when one data path has a hundred percent load balancing share, then failover mode is used.

16. The system of claim 15, wherein the circuitry operable to determine whether the command is capable of being routed through the first network adapter is operable to determine whether an indication that the first network adapter failed was received.

17. The system of claim 15, wherein the circuitry to route the command is operable to:
  forward the command to a low level driver with an indication of the selected network adapter.

18. The system of claim 15, wherein the circuitry is operable to:
  perform the load balancing between the first network adapter and the second network adapter when both network adapters are available.

19. An article of manufacture comprising a computer readable medium storing code for static load balancing, wherein the code, when executed on a processor, is operable to:
  receive input parameters of a list of data paths in a network adapter team, a total number of bytes transferred across the data paths in the network adapter team, a load balancing share of each data path, and a number of bytes transferred on each data path, wherein the load balancing share represents a percentage of a total read or write workload that a given data path in the network adapter team can take, wherein the load balancing share for at least one data path is different for a read workload and a write workload, wherein the load balancing share is specified by a user;
  for each data path in a network adapter team, compute a load balancing value by:

dividing the total number of bytes by the number of bytes transferred on the data path to generate a first value; and multiplying the first value by the load balancing share of the data path;

determine a maximum value of the computed load balancing values; and select a data path with the maximum value for use in routing data.

20. An article of manufacture comprising a computer readable medium storing code for dynamic load balancing, wherein the code, when executed on a processor, is operable to:

receive input parameters of a list of data paths in the network adapter team, a total number of bytes transferred by the network adapter team in a last time frame, a load balancing share of each data path in the last time frame, and a number of bytes transferred on each data path in the last time frame;

compute an actual load balancing share for each data path in a network adapter team by dividing the number of bytes transferred on that data path by a total number of bytes transferred by the network adapter team in the last time frame;

compute a difference load balancing value for each data path in the network adapter team by subtracting the load balancing share of the data path from the actual load balancing share of the data path;

for each data path, determine whether the load balancing share for the data path in the last time frame is less than the actual load balancing share for the data path; and in response to determining that the load balancing share is less than the actual load balancing share, adjust the load balancing share of the data path by:

determining whether a difference between the load balancing share and the actual load balancing share is less than a change threshold; and in response to determining that the difference between the load balancing share and the actual load balancing share is less than the change threshold, reducing the load balancing share of the data path;

selecting another data path based on the difference load balancing value of each data path; and increasing the load balancing share of the selected data path.

21. The article of manufacture of claim 20, wherein the load balancing share of the data path in the network adapter team with a lowest difference load balancing value is increased, and wherein, if multiple data paths have the lowest difference load balancing value, a data path from the multiple data paths with a highest actual load balancing share is increased.

22. The article of manufacture of claim 20, wherein the actual load balancing share and the difference load balancing value are computed when a timer fires.

23. The article of manufacture of claim 20, wherein the code, when executed on a processor, is operable to:

receive a timer interval value, a change threshold value, and a load balancing change percent value.

24. An article of manufacture comprising a computer readable medium storing code for failover processing, wherein the code, when executed on a processor, is operable to:

under control of a failover component, intercept a command issued to a target;

determine whether a mode is failover mode or failover and load balancing mode, wherein a first network adapter in a network adapter team is used to route data to the target and a second network adapter in the network adapter team is quiescent with respect to the target in the failover mode, and wherein the first network adapter and the second network adapter are used to route data to the target in the failover and load balancing mode;

in response to determining that the mode is the failover and load balancing mode, work with a load balancing component to perform load balancing based on load balancing shares of data paths in the network adapter team;

determine whether the command is capable of being routed through a first network adapter in the network adapter team to the target;

route the command through the first network adapter in response to determining that the command is capable of being routed through the first network adapter;

route the command through a second network adapter in the network adapter team in response to determining that the command is not capable of being routed through the first network adapter; and determine whether to switch between the failover mode and the failover and load balancing mode based on the load balancing shares of data paths between the network adapters in the network adapter team and the target, wherein, when one data path has a hundred percent load balancing share, then failover mode is used.

25. The article of manufacture of claim 24, wherein the code, when executed on a processor, is operable to determine whether a command is capable of being routed through a first network adapter is operable to determine whether an indication that the first network adapter failed was received.

26. The article of manufacture of claim 24, wherein code, when executed on a processor, is operable to route the command is operable to:

forward the command to a low level driver with an indication of the selected network adapter.

27. The article of manufacture of claim 24, wherein the code, when executed on a processor, is operable to:

perform the load balancing between the first network adapter and the second network adapter when both network adapters are available.

* * * * *

UNITED STATES PATENT AND TRADEMARK OFFICE
CERTIFICATE OF CORRECTION

PATENT NO. : 7,760,626 B2  Page 1 of 1
APPLICATION NO. : 10/815349
DATED : July 20, 2010
INVENTOR(S) : Navneet Malpani et al.

It is certified that error appears in the above-identified patent and that said Letters Patent is hereby corrected as shown below:

Col. 14, Line 52, delete "a computer" and replace with --a non-transitory computer--.
Col. 15, Line 10, delete "a computer" and replace with --a non-transitory computer--.
Col. 16, Line 5, delete "a computer" and replace with --a non-transitory computer--.

Signed and Sealed this

Thirtieth Day of November, 2010

David J. Kappos
*Director of the United States Patent and Trademark Office*